United States Patent [19]

Rungta et al.

[11] Patent Number: 5,377,901
[45] Date of Patent: Jan. 3, 1995

[54] METHOD FOR IMPROVING CORROSION RESISTANCE OF PLATE-TYPE VACUUM BRAZED EVAPORATORS

[75] Inventors: Ravi Rungta, East Amherst; William H. Anthony, Clarence Center, both of N.Y.

[73] Assignee: General Motors Corporation, Detroit, Mich.

[21] Appl. No.: 52,975

[22] Filed: Apr. 27, 1993

[51] Int. Cl.$^6$ .............................................. B23K 1/19
[52] U.S. Cl. ................................. 228/183; 228/222; 228/233.2; 228/262.51
[58] Field of Search ................. 228/262.51, 222, 233.2, 228/183

[56] References Cited

U.S. PATENT DOCUMENTS

| | | | |
|---|---|---|---|
| 4,035,201 | 7/1977 | Anderson et al. | 148/11.5 A |
| 4,172,548 | 10/1979 | Nakamura | 228/232 X |
| 5,037,707 | 8/1991 | Fortin et al. | 428/654 |
| 5,125,452 | 6/1992 | Yamauchi et al. | 428/654 X |
| 5,176,205 | 1/1993 | Anthony | 165/133 |

FOREIGN PATENT DOCUMENTS

| | | | |
|---|---|---|---|
| 128668 | 10/1981 | Japan | 228/183 |
| 30741 | 2/1990 | Japan | 148/535 |
| 142672 | 5/1990 | Japan | 228/183 |
| 147163 | 6/1990 | Japan | 228/183 |
| 9672 | 1/1993 | Japan | 148/535 |

OTHER PUBLICATIONS

Kirk–Othmer, "Encyclopedia of Chemical Technology," Third Edition, vol. 2, (1978), pp. 181–183.

*Primary Examiner*—Kenneth J. Ramsey
*Attorney, Agent, or Firm*—George A. Grove

[57] ABSTRACT

A method is provided for enhancing the corrosion resistance of a 3000 series aluminum alloy. In particular, the method encompasses processing steps which promote corrosion resistance of brazed assemblies, such as tube-plate-and-center type evaporator units for automobile air conditioning systems. The method is directed at virtually eliminating the precipitation of $CuAl_2$ particles in the grain boundaries of a 3000 series aluminum alloy, such that evaporator units formed from such an alloy are characterized by enhanced and more consistent corrosion resistance, as well as improved mechanical properties. The primary processing step involves rapidly cooling the evaporator unit after brazing so as to maintain the copper present in the 3000 series aluminum alloy in solid solution. In addition, the reheat and annealing steps are preferably controlled so as to avoid the formation of $CuAl_2$ particles prior to brazing.

9 Claims, 3 Drawing Sheets

METHOD FOR IMPROVING CORROSION RESISTANCE OF PLATE-TYPE VACUUM BRAZED EVAPORATORS

The present invention is directed to a method for enhancing the corrosion resistance of aluminum alloy brazed assemblies, such as tubeplate-type evaporator units within an automotive air conditioning system. More particularly, this invention relates to a method for processing the aluminum alloy material used to form such an assembly, the method being characterized by selecting a 3000 series aluminum alloy which has been processed so as to prevent formation of grain boundary particles of $CuAl_2$, and rapidly cooling the assembly after brazing so as to prevent the precipitation of these particles within the grain boundaries as the assembly cools, such that intergranular corrosion of the resulting brazed assembly is significantly inhibited.

BACKGROUND OF THE INVENTION

Air conditioning systems used in automobiles and other vehicles conventionally include an evaporator unit into which a cooled liquid refrigerant is sprayed so as to revaporize the refrigerant. The heat of vaporization required for vaporizing the refrigerant is drawn from the incoming outside air, which is blown around the evaporator. So as to maximize the amount of surface area available to the incoming air and, correspondingly, to more efficiently cool and dry that air, the design of the evaporator unit is typically a tubeplate-and-air center type heat exchanger containing flat ribbed tubes, similar to the tube-and-fin type designs.

The evaporator is assembled by stacking and brazing together matching clad aluminum sheet components, referred to as tubeplates. Each tubeplate is formed from an aluminum brazing stock material which has been stamped so as to define an internal passage through the evaporator when properly mated with another tubeplate. The evaporator unit is then formed by stacking and brazing a number of tubeplates together.

Due to the numerous brazements which must be formed, it is most efficient to braze the tubeplates during a single brazing operation. Generally, this is accomplished by forming the tubeplates from an aluminum alloy brazing stock material. A typical brazing stock material consists of, for example, an appropriate aluminum alloy core which has been clad on both sides with an aluminum-based brazing alloy. Typically, the cladding layers are an aluminum-silicon eutectic brazing alloy characterized by a melting point lower than the core aluminum alloy. Therefore, the clad layers of brazing alloy melt during the vacuum brazing operation and flow toward the desired joint regions and, upon cooling, solidify to form the brazements. The core aluminum alloy does not melt during the brazing operation and thereby constitutes the structural part of the tubeplate-and-center type evaporator.

In the past, the aluminum alloy brazing stock material routinely used to form these types of plate type evaporators has consisted of a core layer of aluminum alloy AA 3005, as designated by the Aluminum Association (AA), which has been clad on both sides by an aluminum-silicon brazing alloy, such as aluminum alloy AA 4047. As a 3000 series aluminum alloy, AA 3005 is an aluminum-manganese alloy. Generally speaking, this particular aluminum alloy brazing stock material has performed satisfactorily over the years. In particular, the material is easily stamped for formation of the tubeplates, with no inherent brazing difficulties associated with its use, and the structural integrity of the material is considered to be sufficient.

However, the corrosion resistance of evaporator units formed from this specific material is less than desired. Corrosion is particularly problematic if the tubeplates of the evaporator unit are exposed to long periods of wetness due to the use of a climate control switch within the passenger compartment of the automobile which automatically regulates the temperature of the incoming air. The corrosion problem associated with the AA 3005 alloy appears to be due not only to the presence of the condensate which is particularly aggressive to aluminum, but also the presence of sulfur and chloride compounds within the incoming air.

In the past, the corrosion resistance of an air conditioning evaporator formed from this conventional aluminum brazing stock material would typically be enhanced by coating the evaporator with a protective chromate layer. However, due to increased concerns about the environment, the industry is working to eliminate the use of this protective chromate coating because of the toxic byproducts produced by the process. Therefore, it would be preferable to eliminate the use of the chromate conversion process entirely.

U.S. Pat. No. 5,176,205 to Anthony, assigned to the assignee of this invention, significantly overcomes the corrosion problems associated with prior art aluminum alloy brazing stock materials, such as those which employ the AA 3005 alloy. Specifically, Anthony developed an improved aluminum alloy brazing stock which contains an aluminum alloy core material characterized by a higher copper concentration and a lower manganese concentration as compared to the conventional aluminum alloy AA 3005. The higher concentration of copper within the aluminum alloy core material reduces the electrode potential differential between the core alloy and the aluminum-silicon brazing alloy, which is clad to the core alloy and which forms the multitude of brazements within the evaporator unit during the brazing operation.

A particularly advantageous feature of the alloy developed by Anthony is that an air conditioning evaporator unit formed from the alloy is characterized by enhanced corrosion resistance, as compared to the conventional aluminum alloy brazing stock material which has been treated with a protective chromate coating. Further, the strength of the alloy is sufficient to contain a high pressure refrigerant even over extended thermal cycling which is characteristic of an automotive environment.

However, improvements in corrosion resistance are continuously being sought in the relevant industries to further enhance service life and durability. Specifically, it would be desirable to further enhance the corrosion resistance of an evaporator unit formed from a suitable alloy, so as to survive the aggressive automotive environment without the requirement for an additional protective chromate coating. In addition, it would be desirable if greater consistency in corrosion resistance could be attained, so as to minimize the occurrence of premature failures of evaporator units in service.

SUMMARY OF THE INVENTION

It is therefore an object of this invention to provide a method for forming an evaporator unit for an automobile air conditioning system, wherein the method significantly enhances the corrosion resistance of the evaporator unit.

It is a further object of this invention that such a method be specifically suited for enhancing corrosion resistance in aluminum alloy brazing stock material formed from the aluminum alloy taught by U.S. Pat. No. 5,176,205 to Anthony, as well as conventional 3000 series aluminum alloys such as AA 3005.

It is another object of this invention that such a method be particularly capable of substantially preventing the formation of $CuAl_2$ particles in the aluminum alloy brazing stock material, so as to enhance the corrosion resistance of the evaporator unit by diminishing the occurrence of intergranular corrosion of the aluminum alloy brazing stock material.

Lastly, it is still a further object of this invention that evaporator units formed by such an improved method exhibit greater consistency in corrosion resistance, so as to minimize the occurrence of in-service premature failures.

In accordance with a preferred embodiment of this invention, these and other objects and advantages are accomplished as follows.

According to the present invention, there is provided a method for improving the corrosion resistance of an aluminum alloy brazing stock material which is suitable for use in an evaporator unit within an automobile air conditioning system. As is conventional, the stock material includes an aluminum alloy core material which has been clad on both sides with an appropriate aluminum brazing alloy. The method is directed to substantially preventing the formation of precipitates of alloying elements in the grain boundaries of the aluminum alloy core material and, more specifically, preventing the formation of $CuAl_2$ particles in the grain boundaries.

As is known in the art, the presence of $CuAl_2$ particles in the grain boundaries of aluminum alloys which contain copper as the principal alloying element, such as 2000 series aluminum alloys, promotes intergranular corrosion of these alloys. In contrast, 3000 series aluminum alloys contain manganese as the principal alloying element, with substantially lower levels of copper being present. It has been believed that the copper content in these alloys is sufficiently low so as to play a minor role in the corrosion behavior of these alloys. In fact, it has been conventionally believed that $(Fe,Si)MnAl_6$ type precipitates control the corrosion behavior of 3000 series aluminum alloys.

However, in accordance with this invention, it has been determined that unexpected and substantial improvements in corrosion resistance of a 3000 series aluminum alloy can be attained by appropriately processing such alloys to keep the relatively low level of copper in solid solution, so as to inhibit the precipitation of $CuAl_2$ particles in the grain boundaries of these alloys. Furthermore, by preventing the precipitation of $CuAl_2$ particles in the grain boundaries of the 3000 series aluminum alloys, it has also been discovered that greater consistency in corrosion resistance can be attained, so as to minimize the occurrence of premature failures of evaporator units made from these alloys. Finally, it has also been determined that evaporator units formed by such processing methods exhibit enhanced mechanical properties, enabling the evaporator units to more readily withstand repeated thermal cycling within a typical automotive environment.

Generally, the method of this invention includes forming the individual components from a brazing alloy stock material which includes a 3000 series aluminum alloy clad with a suitable brazing alloy. The 3000 series aluminum alloy is processed such that alloying elements which cannot be resolutionized at aluminum brazing temperatures, such as copper, are in solid solution. As a result, precipitates of the alloying elements are substantially absent from the grain boundaries of the 3000 series aluminum alloy. According to a particular aspect of this invention, processing steps which discourage the formation of $CuAl_2$ precipitates include the time for which the original aluminum alloy ingot is reheated prior to hot rolling, and the time and temperature at which the stock material is annealed after cold rolling and prior to formation of the evaporator components, such as by stamping.

After forming, the components are assembled and subjected to a sufficiently high temperature such that the brazing alloy melts and forms braze joints between the individual components, thereby forming a brazed aluminum alloy assembly. After brazing, the assembly is rapidly cooled at a rate which is sufficient to substantially maintain the alloying elements in solid solution so as to substantially prevent precipitation of the alloying elements within the grain boundaries of the 3000 series aluminum alloy. Specifically, the conventional method of slow cooling the evaporator unit has been found to be inadequate, necessitating the use of forced convection or quenching to drop the temperature of the brazed assembly at a sufficiently rapid rate.

As noted above, a particularly advantageous feature of this method is that intergranular corrosion of the brazed aluminum alloy assembly is significantly inhibited as a result of the virtual absence of precipitates of the alloying elements within the grain boundaries of the 3000 series aluminum alloy. More specifically, it is the absence of $CuAl_2$ particles in the grain boundaries of the 3000 series aluminum alloy which unexpectedly and substantially enhances the corrosion resistance of articles made from the alloy. This invention recognizes the detrimental effect that intergranular $CuAl_2$ particles have on the corrosion resistance of a 3000 series aluminum alloy and provides a method for substantially eliminating their formation. Thus, substantial improvements in corrosion resistance have been attained using the method of this invention for evaporator units, particularly when formed with the aluminum alloy disclosed in U.S. Pat. No. 5,176,205 to Anthony.

In addition, it has been discovered that greater consistency in corrosion resistance is also attained by preventing the precipitation of $CuAl_2$ particles in the grain boundaries of the aluminum alloys of interest. As a result, the occurrence of premature failures of evaporator units made from these alloys can be expected to be greatly reduced.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawing wherein.

DETAILED DESCRIPTION OF THE INVENTION

According to the present invention, there is provided a method by which the corrosion resistance of a 3000 series aluminum alloy can be enhanced. More specifically, this invention encompasses processing steps which promote corrosion resistance of brazed assemblies, such as tubeplate-and-center type (or plate type) evaporator units for automobile air conditioning systems. The method of this invention serves to virtually eliminate the precipitation of $CuAl_2$ particles in the grain boundaries of 3000 series aluminum alloys, such that evaporator units formed from such alloys are characterized by enhanced and more consistent corrosion resistance, as well as improved mechanical properties. As a result, evaporator units formed in accordance with this invention exhibit improved durability and service life. Furthermore, it is believed that sufficient corrosion resistance can be achieved by the method of this invention so as to eliminate the requirement for chromate conversion coatings.

Figure 1:
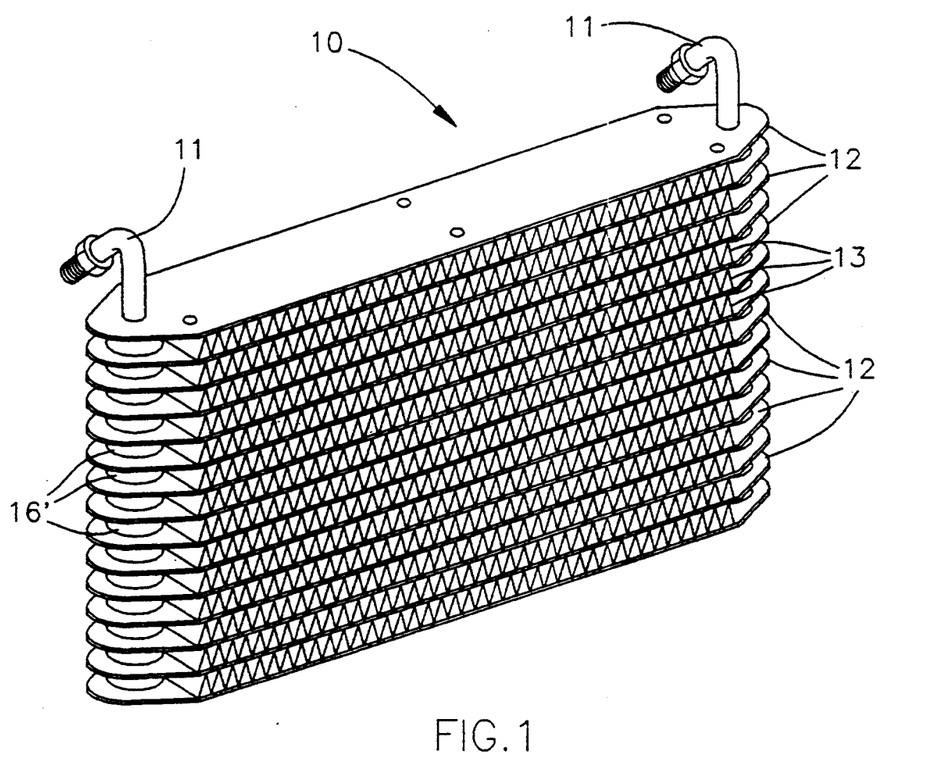
FIG. 1 is a perspective view of a conventional tubeplate-and-center type evaporator used within automobile air conditioning systems.

Shown in FIG. 1 is a perspective view of a conventional tubeplate-and-center type evaporator unit 10 used in automobile air conditioning systems. The tubeplate-and-center design is preferred for these types of heat exchangers, i.e., an air conditioning evaporator 10, because this design maximizes the amount of surface area that is in contact with the incoming air, resulting in more efficient cooling of the incoming air. The evaporator unit 10 includes a number of tubeplates 12 which are stacked on top of each other as shown, with an air center 13 being positioned between each adjacent pair of tubeplates 12. This arrangement of tubeplates 12 and air centers 13 is brazed so as to form a solid structure.

Figure 2:
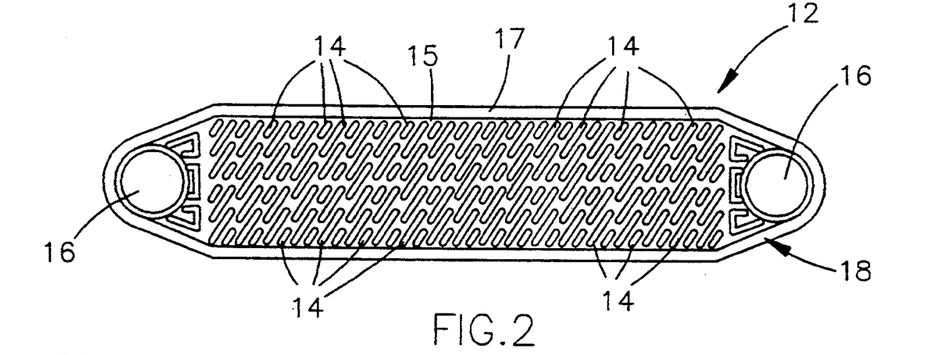
FIG. 2 is a top view of a tubeplate of the evaporator unit shown in FIG. 1.

As seen in FIG. 2, each tubeplate 12 includes a pair of bottomless flanged cups 16 formed at opposite ends of the tubeplate 12. As illustrated in FIG. 1, each cup 16 is brazed to the abutting cup 16 of an adjacent tubeplate 12 so as to define a manifold 16' within the evaporator unit 10. Appropriate fittings 11 are provided as an inlet and an outlet to the manifold 16' for a refrigerant which flows through the evaporator unit 10 during its operation.

In the top view of a tubeplate 12 shown in FIG. 2, it can be seen that the tubeplate 12 is formed with a shallow, recessed flat tube surface 15 from which a number of baffles 14 project. Each tubeplate also has a brazing flange 17 which forms the outer perimeter of the tubeplate 12. Pairs of tubeplates 12 are mated such that their corresponding tube surfaces 15 form a passage through the evaporator unit 10, and air centers 13 are then positioned between paired tubeplates 12 to increase the effective surface area of the evaporator unit 10. The stack of tubeplates 12 and air centers 13 is then banded and brazed so as to concurrently join all of the tubular structures 14 within the evaporator unit 10. As is readily apparent from FIG. 2, numerous brazed joints must be successfully formed at each of the matched baffles 14 during a single brazing operation.

Figure 3:
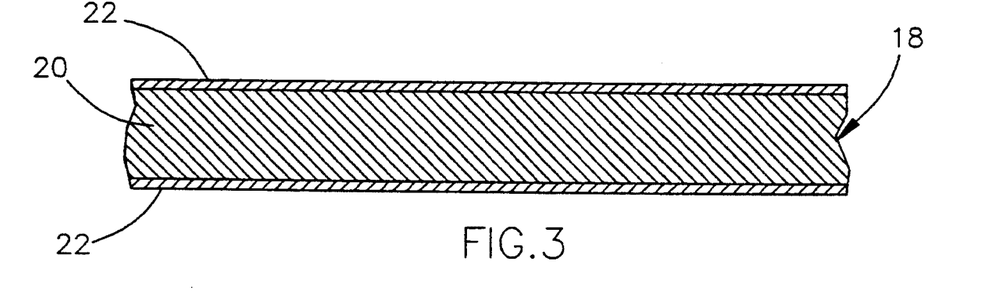
FIG. 3 is an enlarged cross-sectional view of an aluminum alloy brazing stock material of the type which is processed in accordance with the preferred method of this invention.

The preferred material for formation of this type of tubeplate evaporator unit 10 is a clad aluminum alloy brazing stock material 18, as indicated by the cross-section of FIG. 3. An aluminum alloy sheet forms the structural core, or core layer 20, of the stock material 18. This core layer 20 is preferably clad on both surfaces with an appropriate aluminum-based brazing alloy 22 so as to form a sandwich-like structure, as shown.

3000 series aluminum alloys are widely used for the core layer 20. These alloys contain manganese as the principal alloying element, with relatively low levels of copper being present. A preferred 3000 series aluminum alloy for use as the core layer 20 is aluminum alloy AA 3005, as designated by the Aluminum Association (AA). This alloy is characterized by the following elemental analysis by weight: a maximum silicon content of about 0.6 percent, a maximum iron content of about 0.7 percent, a maximum copper content of about 0.30 percent, about 1.0 to about 1.5 percent manganese, about 0.20 to about 0.6 percent magnesium, a maximum chromium content of about 0.10 percent, a maximum zinc content of about 0.25 percent, and a maximum titanium content of about 0.10 percent, with the balance being aluminum with typical quantities of impurities.

A more preferred aluminum alloy for use as the core layer 20 is the aluminum alloy disclosed in U.S. Pat. No. 5,176,205 to Anthony. This alloy (hereinafter referred to as "Alloy A") is characterized by the following elemental analysis on a nominal weight percent basis: between about 0.4 and about 0.5 percent copper; between about 0.5 and about 0.9 percent manganese; between about 0.2 and about 0.4 percent iron; up to about 0.2 percent silicon; about 0.2–0.6 percent magnesium; up to about 0.05 percent titanium; and normal amounts of aluminum-making impurities including up to about 0.1 percent chromium, up to about 0.01 percent nickel and up to about 0.25 percent zinc; the balance of the alloy being aluminum.

Though the range of manganese within Alloy A may vary between about 0.5 and about 0.9 weight percent, a manganese content of about 0.7 weight percent is most preferred. In addition, the most preferred copper concentration is about 0.45 weight percent within Alloy A. Generally, the presence of copper enhances the corrosion resistance of the alloy by making the electrode potential of the core layer 20 within the brazing stock material 18 closer to that of the aluminum-silicon brazing alloy 22.

Though the copper content of Alloy A is higher than that of AA 3005, 2000 series aluminum alloys typically have a copper content which is far greater than that of Alloy A. $CuAl_2$ is the primary precipitate of concern in 2000 series aluminum alloys, particularly from the standpoint of intergranular corrosion of these alloys. In contrast, $MnAl_6$ type precipitates are generally the primary precipitate for 3000 series aluminum alloys in a high purity state. In commercial 3000 series aluminum alloys, $MnAl_6$ precipitates are modified by the presence of such elements as iron and silicon. As a result of the relatively low copper content of Alloy A and the 3000 series alloys, these alloys have not been thought to be susceptible to intergranular corrosion from the presence of $CuAl_2$ precipitates. However, in accordance with this invention, it has been discovered that Alloy A and 3000 series aluminum alloys do form $CuAl_2$ precipitates and that the presence of these precipitates in the grain boundaries of these alloys have a significant and potentially adverse effect on their corrosion resistance.

In accordance with this invention, it has also been determined that the formation of $CuAl_2$ precipitates in the grain boundaries of a 3000 series aluminum alloy or Alloy A can be avoided, such that an improvement in (1) corrosion resistance, (2) consistency of corrosion resistance, and (3) mechanical properties can be achieved. Primarily, the formation of $CuAl_2$ precipitates is avoided by rapidly cooling the evaporator unit 10 immediately after it leaves the brazing furnace. It is believed that the process of rapidly cooling the evaporator unit 10 serves to hold the alloying elements in solid solution within the core layer 20, the brazing alloy 22, and the interalloyed layers which are formed between the core layer 20 and the brazing alloy 22 as a result of the alloys of the core layer 20 and brazing alloy 22 having been intermixed.

In accordance with the findings of this invention, $CuAl_2$ precipitates have been found to form in the grain boundaries of Alloy A and the AA 3005 alloy if the brazing stock material 18 has not been subjected to a sufficiently rapid cooling. However, by employing the method of this invention, these precipitates can be placed in solid solution or otherwise altered in a manner so as to reduce their potential to initiate intergranular corrosion of the brazing stock material 18 when the evaporator unit 10 is subjected to a corrosive environment. It is believed that such effects are constant over time such that the benefits of the rapid cooling process will persist through the useful life of an automobile in which the evaporator unit 10 is installed.

Conventional slow cooling of brazed evaporator units 10 roughly occurs at a rate of about 100° F. per minute. Such a cooling rate is sufficiently low so as to permit the formation of $CuAl_2$ particles in the grain boundaries of the brazing stock material 18. In accordance with this invention, in order to virtually eliminate the formation of $CuAl_2$ precipitates at the grain boundaries, a preferred rate approaches about 12,000° F. per minute as the result of using a water quench to cool the evaporator unit 10. At such a cooling rate, lattice strain was observed due to the supersaturation of copper in the lattice. While the optimum cooling rate corresponding to a water quench enhances the effects of this method, incremental improvements in corrosion protection can be achieved by forced convection cooling, resulting in cooling rates of about 1800° F. per minute or more.

In accordance with this invention, it has also been determined that grain boundary precipitates of $CuAl_2$ can also form during the manufacturing process of the core layer 20. Specifically, the corrosion resistance of the core layer 20 is strongly dependent upon both its reheat for roll time and its final anneal time and temperature. (Reheat for roll time is the duration at which a cast ingot may be held at the hot rolling temperature before hot rolling begins. Such a hold may occur because of scheduling, accommodating the processing of other products, or because of required maintenance, as well as other reasons.)

For example, metallurgical analysis showed that particles discovered in the grain boundary of an as-produced sheet of Alloy A core material 20 reheated at 950° F. for 13 hours was, in fact, rich in copper and aluminum, leading to the conclusion that these particles were variations of the $CuAl_2$ precipitates.

In order to more clearly characterize the preferred processing parameters of this invention, the typical processing steps for a tubeplate-and-center type evaporator unit 10 are briefly described below.

Conventionally, the processing steps involved in forming the evaporator unit 10 are commenced with a known casting technique to form an aluminum alloy ingot. The ingot is typically homogenized at an elevated temperature for a duration which is sufficient to dissolve any segregation within the cast alloy. After the ingot is cooled to room temperature, the ingot is flattened on two surfaces, and a "sandwich" is prepared which consists of a brazing alloy on both sides of the flattened ingot.

The preferred brazing alloy is an aluminum-silicon brazing alloy such as AA 4047. Brazing alloy AA 4047 is well known in the art and is characterized by a nominal composition of about 12 weight percent silicon, with the balance being aluminum. It is a eutectic brazing alloy, and therefore melting is initiated at its eutectic temperature during the brazing operation, which is less than the melting temperature of the core layer 20. As is well known in the art, other suitable brazing alloys could be substituted for AA 4047.

The sandwich is then reheated for rolling. The hot rolling process is important in that it not only produces a metallurgical bond between the core layer 20, formed from the ingot, and the braze alloy layers 22, formed from the braze alloy, but also reduces the thickness of the ingot significantly. In the conventional process, this reheat for roll step, where the ingot may be held at the hot rolling temperature before actual rolling, can be as long as 24 hours. However, the present invention seeks to limit this time period so as to enhance the corrosion resistance of the core layer 20. Final thickness of the sandwich structure, which then forms the brazing stock material 18 shown in FIG. 3, is preferably achieved by cold rolling.

After rolling to the desired thickness, it is conventional to anneal the brazing stock material 18 in a nitrogen atmosphere to eliminate the residual work hardening effects associated with the rolling process so as to fully soften the material. As a result, the aluminum brazing stock material 18 will be sufficiently ductile so as to permit the tubeplates 12 to be formed by stamping at room temperature using conventional techniques.

The stamped tubeplates 12 are then stacked and banded using production techniques known in the industry for formation of the evaporator unit 10. The evaporator unit 10 is then conventionally brazed in a three chamber vacuum brazing furnace. Typically, the evaporator unit 10 is first placed in an entrance vestibule of such a furnace, which is then evacuated and heated to a temperature of up to about 750° F. The evaporator unit 10 is then moved to the brazing chamber, where the assemblies are subjected to a high vacuum of about $10^{-5}$ to about $10^{-4}$ microns, and a temperature of at least about 1100° F. At this temperature, the brazing alloy 22 liquefies and fills the joints in the assembly so as to produce a leak-free evaporator unit 10. After about 17 to about 21 minutes, the assemblies are removed from the brazing chamber and placed in the exit chamber, where they are allowed to cool.

Figure 4:
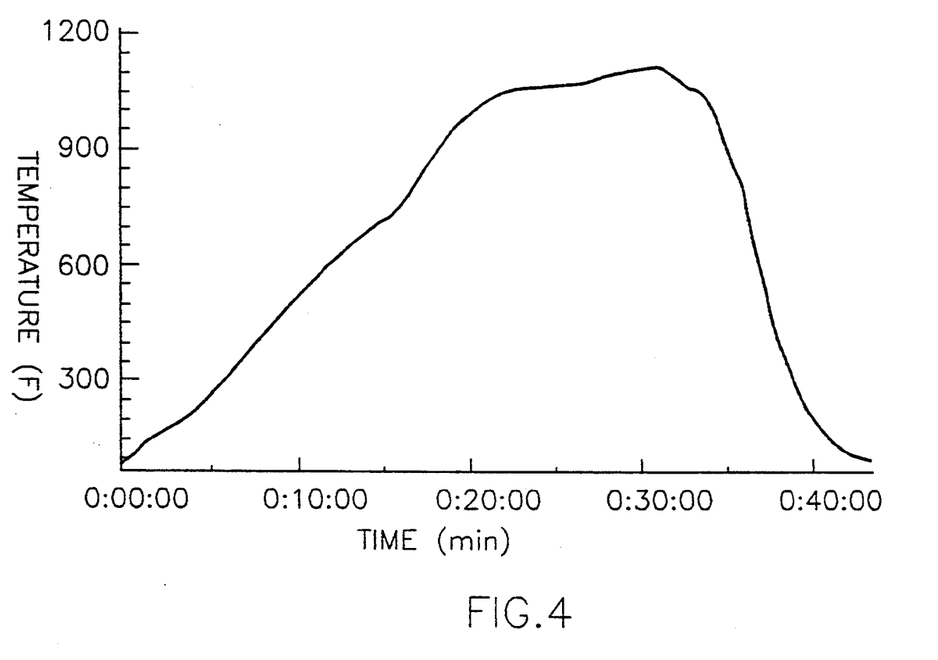
FIG. 4 is a graph which illustrates a conventional brazing cycle which is characterized by a slow cooling rate after brazing.
Figure 6:
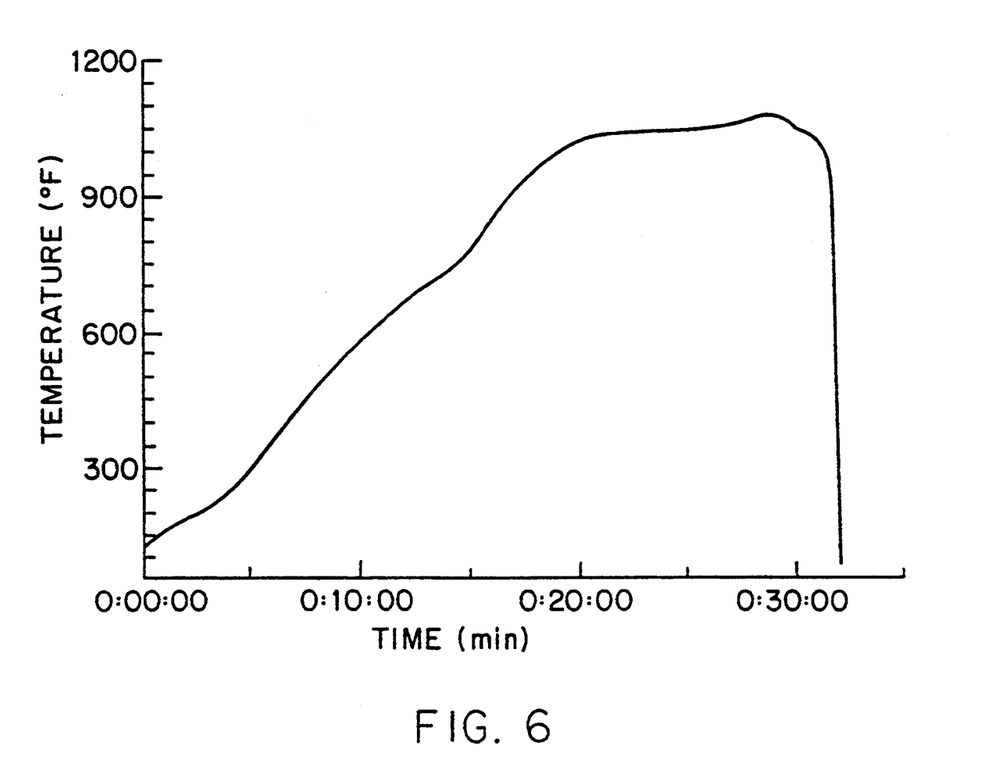
FIG. 6 is a graph which illustrates a preferred brazing cycle including a rapid cooling technique in accordance with the preferred method of this invention.

In a typical brazing process, cooling is achieved by slowly blowing air through the evaporator unit 10. This step is designed simply from the standpoint that the evaporator unit 10 must be sufficiently cooled to allow handling by operators during manufacturing. FIG. 4 depicts temperature versus time for a typical braze cycle utilizing such a cooling method, exhibiting a cooldown rate of about 100° F. per minute. In contrast, the present invention seeks to alter the braze cycle by utilizing a much more rapid cooling rate, as depicted in FIG. 6, so as to enhance the corrosion resistance of the core layer 20, as will be discussed more fully below.

A vacuum furnace is preferably used so as to reduce or eliminate the formation of a detrimental oxide layer and the corresponding need for the corrosive flux typically employed in air furnace brazing operations. In addition, the vacuum brazing facilitates the concurrent brazing of the multitude of brazed joints within the evaporator unit 10, which may not be as readily possible with other forms of brazing, such as dip brazing or wire brazing techniques. However, though vacuum furnace brazing is preferred as the method for forming these evaporator units 10, other alternative methods for brazing may be utilized, such as controlled atmosphere brazing (CAB).

The particular thermal cycle used for brazing the evaporator unit 10 will depend on the particular brazing alloy 22 which is clad to the core layer 20. When using alloy AA 4047 as the brazing alloy 22, the optimal range of brazing temperatures is between about 1090° F. and about 11 10° F. The temperatures within this range are sufficient to ensure complete melting of this eutectic brazing alloy 22, in that the approximate melting point of alloy AA 4047 is about 1070° F. to about 1080° F. As would be expected, the melting temperature of the core layer 20 must be sufficiently higher than the brazing temperature employed so as to maintain the preferred mechanical properties of this alloy during the brazing operation.

In general, lower brazing temperatures are preferable for promoting better braze joints because the brazing alloy 22 has a greater tendency to diffuse into the core layer 20 at relatively high braze temperatures, which is undesirable from the standpoint of corrosion resistance, as well as the mechanical properties of the evaporator unit 10. Simultaneously, the brazing temperature must also be sufficiently high to cause the brazing alloy 22 to be drawn by capillary action toward the seams at the desired braze joints such that, upon cooling, the brazing alloy 22 will solidify to form the desired braze bond. As stated previously, other brazing alloys can be used, so long as they are characterized by a melting temperature which is sufficiently less than the melting temperature of the core layer 20.

With the above in mind, the following examples are provided which illustrate the advantageous effects that the preferred processing steps of this invention have on the corrosion resistance of both Alloy A and the AA 3005 alloy.

EXAMPLE 1

To isolate the effect which the rate of cooling after brazing has on the mechanical properties of a preferred aluminum alloy, eight tensile test specimens were cut from brazing stock material 18. The brazing stock material 18 was composed of Alloy A as the core layer 20 and AA 4047 as the brazing alloy 22. Emission spectroscopy indicated the following nominal elemental analysis of the core layer on a weight percent basis: about 0.4 percent copper, about 0.74 percent manganese, about 0.35 percent iron, about 0.15 percent silicon, about 0.03 percent titanium, about 0.5 percent magnesium, and about 0.02 percent zinc, the balance of the alloy being substantially aluminum.

The tensile specimens were subjected to a brazing simulation in a laboratory Ipsen furnace using a typical braze cycle, as indicated by the portion of FIG. 4 which illustrates a rising and then stabilized elevated temperature. Immediately afterwards, four test specimens were cooled by forced convection at a rate of about 1800° F. per hour, while the remaining test specimens were allowed to cool within the furnace at the furnace's natural cooling rate of about 300° F. per hour, i.e., without any air circulation. A thermocouple was inserted between test specimens to measure the rate of cooling, the results of which are indicated in Table I below. Tensile tests were then conducted to determine the tensile strength, yield strength and percent elongation. The results were averaged, as summarized in Table I.

TABLE I

| Cooling Rate (°F./hr) | Average Tensile Strength (psi) Avg. | Tensile Strength (psi) Std. Dev. | Average Yield Strength (psi) Avg. | Yield Strength (psi) Std. Dev. | Percent Elongation |
| --- | --- | --- | --- | --- | --- |
| 300 | 14,867 | 154 | 5840 | 485 | 12 |
| 1800 | 18,770 | 323 | 7830 | 231 | 11 |

The above results indicated a 26 percent increase in tensile strength and a 34 percent increase in yield strength due to cooling at the higher rate. The resulting increase in burst strength would be of considerable significance if reliably achieved in production.

The purpose of the tests conducted in Example 1 was to demonstrate that faster cooling would improve the mechanical properties of the core alloy. As will be shown in later examples, faster cooling also improves the corrosion resistance of the core alloy. It is believed that improvements in mechanical properties at higher cooling rates occur because of solid solution strengthening.

It should also be noted that the higher cooling rate employed here was due to forced air convection and not water quenching. Water quenching would be preferable in terms of the rate of cooling attainable, with the capability of achieving cooling rates of as much as 12,000° F. per minute, as opposed to the 1800° F. per hour employed here with forced air convection.

EXAMPLE 2

Four groups of evaporators were brazed in a conventional three chambered furnace. The braze stock material 18 for the evaporators was formed with core layers 20 of either AA 3005 alloy or Alloy A, with AA 4047 as the brazing alloy 22. The materials, chemistry and processing times for each group of evaporators are indicated in Table II below. The reheat for roll temperature was about 950° F., and the final annealing temperature was about 670° F.

TABLE II

| Evaporator Material | Anneal (hrs) | Reheat (hrs) | Chemistry | | | | |
| --- | --- | --- | --- | --- | --- | --- | --- |
| | | | Si | Fe | Cu | Mn | Mg |
| AA 3005 | 3 to 5 | 1.3 | 0.26 | 0.57 | 0.13 | 1.1 | 0.52 |
| AA 3005 | 3 to 5 | 11 | 0.28 | 0.56 | 0.11 | 1.06 | 0.49 |
| Alloy A | 3 to 5 | 0 | 0.14 | 0.33 | 0.43 | 0.80 | 0.49 |
| Alloy A | 3 to 5 | 13 | 0.12 | 0.37 | 0.42 | 0.77 | 0.48 |

Temperatures were monitored with a thermocouple during the brazing cycle. From a brazing temperature of about 1110° F., the cooling portion of the cycle was conducted by either slowly cooling the evaporators within exit chamber of the furnace, which again is generally conventional, or rapidly cooling the evaporators with a cold water quench. Three of each group were subjected to rapid cooldown, while a like number were subjected to the slower in-furnace cooldown. FIG. 6 depicts temperature versus time for the braze cycle incorporating the rapid cooldown, with a cooldown rate of about 12,000° F. per minute. In contrast, the cooldown rate for the in-furnace method was about 30° F. per minute, as generally depicted in FIG. 4.

After cooldown, all but one opening was welded shut in each evaporator, the remaining opening being fitted with a valve to permit pressurization of the evaporator. Each evaporator was then pressurized with air to about 200 psi and tested for corrosion resistance by being subjected to a salt spray test administered according to the American Society for Testing Materials (ASTM) G85 Annex A 4.4.4.1. The standardized test requires a continuous spray of five percent salt (NaCl) accompanied by an injection of sulfur dioxide ($SO_2$) gas at the rate of one cubic centimeter per minute per cubic foot of internal space in the testing cabinet for one hour every six hours. The cabinet temperature was maintained at 95° F.

The above test was selected because it is believed that such a test most closely simulates the service environment of an evaporator unit. In addition, the test provides a quantitative measure of the time required to develop a leak in an evaporator unit of the type described. Such information can then be used to quantitatively compare the corrosion resistance of evaporator units formed under different conditions.

The evaporators were tested to failure, with failure being defined as a 30 psi drop in pressure within the evaporator. A final leak check was then conducted by immersing the failed evaporator in water to locate the point of failure. All leaks occurred in the region of the cup 16 in one of the tubeplates 12.

Figure 5:
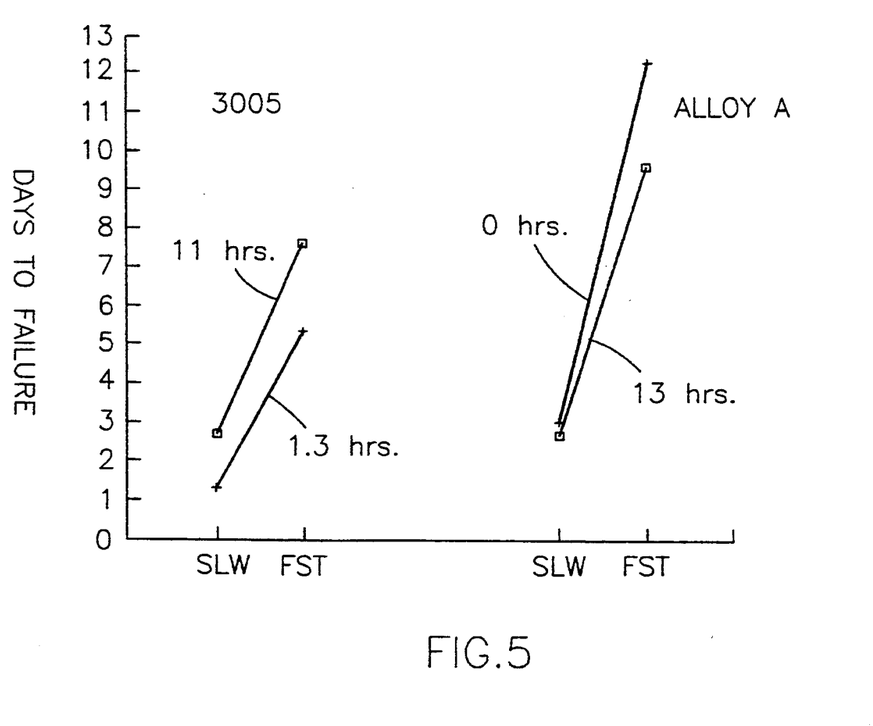
FIG. 5 diagrammatically illustrates relative improvements in corrosion resistance which are attainable by the processing methods of this invention.

The average time to failure in each group of three units is depicted in FIG. 5, in which the Y axis denotes the days to failure while the X axis denotes the cooling rate used ("SLW" for the low cooling rate and "FST" for the rapid cooling rate). FIG. 5 shows that the time to failure is most strongly affected by the rate at which the evaporators are cooled from the braze temperature. This is true whether the core layer 20 was formed from the AA 3005 alloy or Alloy A.

The results also indicate that, with a low cooling rate (about 30° F. per minute) and a longer reheat to roll time (11 or 13 hours), there is little difference in time to failure between the AA 3005 alloy and Alloy A. In contrast, when subjected to the rapid cool rate (about 12,000° F. per minute), a significant improvement in time to failure was achieved for both core materials. Transmission electron microscopy indicated that $CuAl_2$ precipitates were present at the grain boundary when the evaporators were slow cooled. No such precipitates were observed when the evaporator units were water quenched. These results suggest that the presence of $CuAl_2$ particles has an adverse effect on the corrosion resistance of the evaporators tested. Accordingly, by eliminating $CuAl_2$ precipitates in the grain boundaries of the core layer 20 by rapidly cooling an evaporator unit after brazing in accordance with this invention, a significant improvement in corrosion resistance resulted.

The reheat for roll time for the hot rolling process also appeared to be significant at a secondary level. The data indicated that a brief duration for reheating for roll is advantageous for Alloy A, while a longer time for reheat is advantageous for the AA 3005 alloy. Overall, evaporators formed from Alloy A exhibited the best corrosion resistance when processed with a very brief reheat to roll time and when subjected to a rapid cooldown after brazing.

EXAMPLE 3

Two groups of evaporators were brazed in a conventional three chambered furnace. The braze stock material 18 was formed with Alloy A as the core layer 20. The chemistry and reheat for roll time for each group of evaporators are indicated in Table III below. Again, the reheat for roll temperature was about 950° F., while the final annealing temperature and duration were about 670° F. and about 5 hours, respectively.

TABLE III

| Evaporator Sample | Reheat (hrs) | Si | Fe | Cu | Mn | Mg |
|---|---|---|---|---|---|---|
| Sample A | 0 | 0.14 | 0.33 | 0.43 | 0.80 | 0.49 |
| Sample B | 13 | 0.12 | 0.37 | 0.42 | 0.77 | 0.48 |

The evaporators were brazed in accordance with Example 3, with the exception that some units of each sample were conventionally cooled slowly by natural convection within the furnace at a rate of about 30° F. per minute, other units of the each sample were cooled outside the furnace with moderate air flow to achieve a cooling rate of about 100° F. per minute, and the remaining units of each sample were rapidly cooled by water quenching at a rate of about 12,000° F. per minute. The evaporators were tested in the same manner as that described for Example 3. The time to failure for each sample group is summarized below in Table IV.

TABLE IV

| | Days to Failure | | | | | |
|---|---|---|---|---|---|---|
| | Natural Conv. | | Forced Conv. | | Water Quench | |
| Sample | Data | Avg. | Data | Avg. | Data | Avg. |
| A | 4,7,7 | 6.0 | 6,8,9,9,9 | 8.2 | 11,13,14 | 12.6 |
| B | 7,8,12 | 9.0 | 4,6,6,6,7,9 | 6.3 | 12,13,14 | 13.0 |

The above data indicated that, for samples processed with short reheat times, slow cooling by natural convection resulted in the poorest corrosion resistance, with forced air convection resulting in improved corrosion resistance. However, water quenching clearly exhibited superior corrosion resistance on the basis of a considerably higher average days-to-failure. Again, it was determined that the above differences in corrosion resistance corresponded to the presence of $CuAl_2$ particles in the slower cooled samples and the virtual absence of $CuAl_2$ particles in the quenched samples.

On the basis of consistency, it is important to note that none of the water quenched samples exhibited what may be considered a "short life." The tightness of the distribution for the quenched samples can be readily seen by calculating the weibull distribution parameters. Results of such calculations are as follows.

TABLE V

| Cooling Method | B1 Life (days) | B10 Life (days) | B50 Life (days) |
|---|---|---|---|
| Natural Convection | 0.5 | 3.8 | 7.2 |

TABLE V-continued

| Cooling Method | B1 Life (days) | B10 Life (days) | B50 Life (days) |
| --- | --- | --- | --- |
| Forced Convection | 2.7 | 4.7 | 7.4 |
| Water Quench | 8.8 | 11.0 | 13.0 |

The above statistical summary indicates that a substantial if not complete elimination of premature failures could be achieved if the water quench method was adopted in the production process of an evaporator unit, such as the one illustrated in FIG. 1.

EXAMPLE 4

Tubeplates 12 were made from Alloy A whose reheat to roll was conducted at a temperature of about 950° F., with essentially no hold time at this temperature prior to hot rolling. Final anneal was conducted at a temperature of about 670° F. for a duration of about five hours. The tubeplates 12 were assembled and brazed at a temperature of about 1105° F. to form a number of evaporator units 10. One group of evaporators units was cooled at a rate of about 100° F. per minute, which again is the conventional method. A second group of the evaporators was cooled by forced convection using fans to achieve a cooling rate of about 350° F. per minute.

The ASTM test procedure described in Example 2 was then repeated for these samples, with the following results.

TABLE VI

| Cooling Method | Days to Failure |
| --- | --- |
| Natural Convection | 7,7,8,8,11 |
| Forced Convection | 11,11,11,12,15,15 |

The above results indicate that improved corrosion resistance can be achieved using sufficient forced convection such that cooling rates are increased. As cooling rates are increased, the continuity of $CuAl_2$ precipitates at the grain boundary is broken, thereby reducing susceptibility to intergranular corrosion. Again, these results reflect the degree to which $CuAl_2$ particles are present within the intergranular boundary of the core layer 20 from which the tubeplates 12 were formed.

EXAMPLE 5

As a final investigation, samples of Alloy A were processed for the purpose of isolating the effect which final annealing has on corrosion resistance. The reheat for roll temperature was about 950° F., while the reheat for roll time was varied between about two hours and about fifteen hours. Final anneal was conducted at a temperature of about 670° F. for a duration of either about two hours, three hours or five hours. Evaporator samples were then formed, brazed and cooled in accordance with Example 2 and the brazing cycle of FIG. 4, with a brazing temperature of about 1110° F. and a cooling rate of about 100° F. per minute. The ASTM test procedure described in Example 2 was then repeated.

The results from this investigation strongly indicated that a shorter anneal time significantly improved the corrosion resistance of the samples in terms of their days to failure. The best corrosion resistance consistently occurred with an anneal time of about two hours, while slightly poorer results occurred with an anneal time of about three hours. Relatively speaking, the poorest results were the consequence of the five hour anneal. Though shorter anneal times were determined to be optimal for purposes of corrosion resistance, the duration for final anneal must also be sufficiently long to relieve internal stresses induced by work hardening during the cold roll process. Accordingly, it is estimated that a minimum duration for the annealing process would preferably be about one hour, with three hours appearing to be a preferred maximum duration.

From the discussion above, it appears that, for the successful application of a fast cooling process following the brazing operation, the brazing stock material 18 must be processed at optimum thermomechanical conditions during ingot-to-sheet processing. Specifically, the preferred processing steps include a longer reheat after roll for the AA 3005 alloy and a shorter reheat after roll for Alloy A, and annealing the braze stock material 18 at a temperature and for a duration which are sufficient to prevent the formation of grain boundary particles of $CuAl_2$. In effect, these preferred processing steps maintain the copper in solid solution in the core alloy 20, which is important from the standpoint that $CuAl_2$ precipitates will not resolutionize at the brazing temperatures which correspond to the preferred aluminum alloys. The subsequent rapid cooling of the brazed evaporator units serves to freeze the alloying ingredients, such as copper, in solid solution, such that they are prevented from precipitating in the grain boundaries as the evaporator units cool.

Accordingly, the effect that a rapid cooldown has on the formation of $CuAl_2$ precipitates is dependent on the time of reheat for roll for the braze stock material 18. For Alloy A, it is believed that a reheat for roll time of less than about six hours at a conventional temperature of between about 950° F. and about 970° F. discourages the formation of $CuAl_2$ precipitates, while a longer reheat for roll time is preferable for a 3000 series alloy such as AA 3005. Furthermore, the duration of the annealing process also influences the formation of $CuAl_2$ precipitates, with annealing times of about one to three hours appearing to be optimal. While an anneal temperature of 670° F. was used throughout the tests described above, it would be apparent to those skilled in the art that annealing temperatures within the range of about 650° F. to about 680° F. would be suitable for implementation in manufacturing.

However, as the ability to control the reheat and annealing steps of the process become more difficult under typical manufacturing conditions, it appears that the need to rapidly cool the evaporator units after brazing becomes even more critical. Based on the above data, it is believed that a cooling rate of at least about 350° F. per minute is preferred in order to ensure a desirable level of corrosion resistance.

From the above, it can be seen that a particularly advantageous feature of this method is that intergranular corrosion of a brazed aluminum alloy assembly can be significantly inhibited as a result of the virtual elimination of $CuAl_2$ precipitates from the grain boundaries of the aluminum alloy used as the core layer 20. Though it was previously believed that the presence of $CuAl_2$ particles was not critical to corrosion resistance in 3000 series aluminum alloys, with this invention, we have determined the existence of adverse effects from the presence of intergranular $CuAl_2$ particles, and a method for substantially eliminating their formation has been achieved. Enhanced corrosion resistance has been most notably attained using the method of this invention for evaporator units formed with the aluminum alloy disclosed in U.S. Pat. No. 5,176,205 to Anthony.

In addition, not only have improvements in corrosion resistance been attained, but greater consistency in corrosion resistance has also been achieved, as illustrated by the results detailed in Example 3. As a result, a significant reduction in the occurrence of premature failures of evaporator units made from the preferred aluminum alloys is also expected.

While our invention has been described in terms of a preferred embodiment, it is apparent that other forms could be adopted by one skilled in the art, such as by using other suitable 3000 series aluminum alloys; or by cladding the core alloy with another brazing alloy; or by modifying the processing steps or evaporator design employed. Accordingly, the scope of our invention is to be limited only by the following claims.

The embodiments of the invention in which an exclusive property or privilege is claimed are defined as follows:

1. A method for forming a brazed aluminum alloy assembly having improved corrosion resistance, the method comprising the steps of:

forming at least two members from a brazing alloy stock material comprising a 3000 series aluminum alloy which is clad with a brazing alloy, the brazing alloy stock material having copper in solid solution such that $CuAl_2$ precipitates are substantially absent from the grain boundaries of the 3000 series aluminum alloy, the forming step including the steps of heating an aluminum alloy ingot to a hot rolling temperature for a duration sufficient to substantially prevent the precipitation of $CuAl_2$ within the grain boundaries of the aluminum alloy ingot, rolling the aluminum alloy ingot while the aluminum alloy ingot remains at approximately the hot rolling temperature so as to form the brazing alloy stock material, and forming the members from the brazing alloy stock material;

annealing the members at a temperature of about 650° F. to about 680° F. and for a duration of about one to about three hours so as to substantially prevent the precipitation of $CuAl_2$ within the grain boundaries of the 3000 series aluminum alloy;

heating the members such that the brazing alloy melts and forms a braze joint between the members so as to form the brazed aluminum alloy assembly;

rapidly cooling the brazed aluminum alloy assembly at a rate of at least about 350° F. per minute so as to substantially maintain the copper in solid solution and thereby substantially prevent precipitation of $CuAl_2$ within the grain boundaries of the 3000 series aluminum alloy as the brazed aluminum alloy assembly cools;

such that intergranular corrosion of the brazed aluminum alloy assembly is significantly inhibited as a result of the copper remaining substantially and homogeneously in solid solution throughout the 3000 series aluminum alloy.

2. A method as recited in claim 1 wherein the brazed aluminum alloy assembly is rapidly cooled by quenching in water.

3. A method as recited in claim 1 wherein the 3000 series aluminum alloy consists essentially of the following by weight:

between about 0.4 and about 0.5 percent copper;
between about 0.5 and about 0.9 percent manganese;
between about 0.2 and about 0.4 percent iron;
up to about 0.2 percent silicon;
up to about 0.05 percent titanium;
between about 0.2 to about 0.6 weight percent magnesium;
up to about 0.1 percent chromium;
up to about 0.01 percent nickel;
up to about 0.25 percent zinc; and
the balance being substantially aluminum with trace amounts of ordinarily present elements.

4. A method for forming an automotive air conditioner evaporator having improved corrosion resistance, the evaporator comprising tubeplate portions which are formed from an aluminum alloy brazing stock material, the aluminum alloy brazing stock material comprising a core formed from a 3000 series aluminum alloy having copper as an alloying ingredient, the aluminum alloy brazing stock material further comprising a metallurgically bonded coating of an aluminum-silicon brazing alloy on at least one surface of the core, the method comprising the steps of:

heating an ingot formed from the 3000 series aluminum alloy to a hot rolling temperature for a duration sufficient for any copper to homogeneously dissolve throughout the alloy, so as to substantially prevent the precipitation of $CuAl_2$ within the grain boundaries of the 3000 series aluminum alloy;

rolling the ingot while the ingot remains at approximately the hot rolling temperature so as to form the aluminum alloy brazing stock material;

annealing the aluminum alloy brazing stock material at a temperature of about 650° F. to about 680° F. and for a duration of about one to about three hours so as to substantially prevent the precipitation of $CuAl_2$ within the grain boundaries of the 3000 series aluminum alloy;

forming the tubeplate portions from the aluminum alloy brazing stock material;

brazing the tubeplate portions such that the aluminum-silicon brazing alloy melts and forms a braze joint between the tubeplate portions so as to form the automotive air conditioner evaporator; and rapidly cooling the automotive air conditioner evaporator at a rate of at least about 350° F. per minute so as to substantially prevent precipitation of $CuAl_2$ within the grain boundaries of the 3000 series aluminum alloy as the automotive air conditioner evaporator assembly cools;

such that intergranular corrosion of the automotive air conditioner evaporator is significantly inhibited as a result of the copper remaining substantially and homogeneously in solid solution throughout the 3000 series aluminum alloy.

5. A method as recited in claim 4 wherein the is rapidly cooled by quenching in water.

6. A method as recited in claim 4 wherein the 3000 series aluminum alloy contains up to about 0.30 weight percent copper, and wherein the ingot is heated for a duration of at least about six hours so as to substantially prevent the precipitation of $CuAl_2$ within the grain boundaries of the ingot.

7. A method as recited in claim 4 wherein the 3000 series aluminum alloy consists essentially of the following by weight:

between about 0.4 and about 0.5 percent copper;
between about 0.5 and about 0.9 percent manganese;
between about 0.2 and about 0.4 percent iron;
up to about 0.2 percent silicon;
up to about 0.05 percent titanium;

between about 0.2 to about 0.6 weight percent magnesium;
up to about 0.1 percent chromium;
up to about 0.01 percent nickel;
up to about 0.25 percent zinc; and
the balance being substantially aluminum with trace amounts of ordinarily present elements.

8. A method as recited in claim 7 wherein the ingot is heated for a duration of no more than about six hours.

9. A method for forming an automotive air conditioner evaporator having improved corrosion resistance, the evaporator comprising tubeplate portions which are formed from an aluminum alloy brazing stock material, the aluminum alloy brazing stock material comprising a core formed from a 3000 series aluminum alloy and a metallurgically bonded coating of an aluminum-silicon brazing alloy on at least one surface of the core;

wherein the 3000 series aluminum alloy consists essentially of the following by weight:
between about 0.4 and about 0.5 percent copper;
between about 0.5 and about 0.9 percent manganese;
between about 0.2 and about 0.4 percent iron;
up to about 0.2 percent silicon;
up to about 0.05 percent titanium;
between about 0.2 to about 0.6 weight percent magnesium;
up to about 0.1 percent chromium;
up to about 0.01 percent nickel;
up to about 0.25 percent zinc; and
the balance being substantially aluminum; and wherein the method comprises the steps of:
heating an ingot formed from the 3000 series aluminum alloy at a hot rolling temperature of about 950° F. to about 970° F. and for a duration of no more than about six hours so as to substantially maintain any copper in solid solution and substantially prevent the precipitation of $CuAl_2$ within the grain boundaries of the 3000 series aluminum alloy;

rolling the ingot while the ingot remains at approximately the hot rolling temperature so as to form the aluminum alloy brazing stock material;

annealing the aluminum alloy brazing stock material at a temperature of about 650° F. to about 680° F. and for a duration of about one to about three hours so as to substantially prevent the precipitation of $CuAl_2$ within the grain boundaries of the 3000 series aluminum alloy;

forming the tubeplate portions from the aluminum alloy brazing stock material;

brazing the tubeplate portions such that the aluminum-silicon brazing alloy melts and forms a braze joint between the tubeplate portions so as to form the automotive air conditioner evaporator; and rapidly cooling the automotive air conditioner evaporator at a rate of at least about 350° F. per minute so as to maintain the copper within solid solution and thereby substantially prevent precipitation of $CuAl_2$ within the grain boundaries of the 3000 series aluminum alloy as the automotive air conditioner evaporator assembly cools;

such that intergranular corrosion of the automotive air conditioner evaporator is significantly inhibited as a result of the copper remaining substantially and homogeneously in solid solution throughout the 3000 series aluminum alloy.

* * * * *